April 30, 1946. C. H. LINDSAY ET AL 2,399,553
AIRCRAFT FIRE EXTINGUISHING SYSTEM
Filed Oct. 27, 1944 3 Sheets-Sheet 1
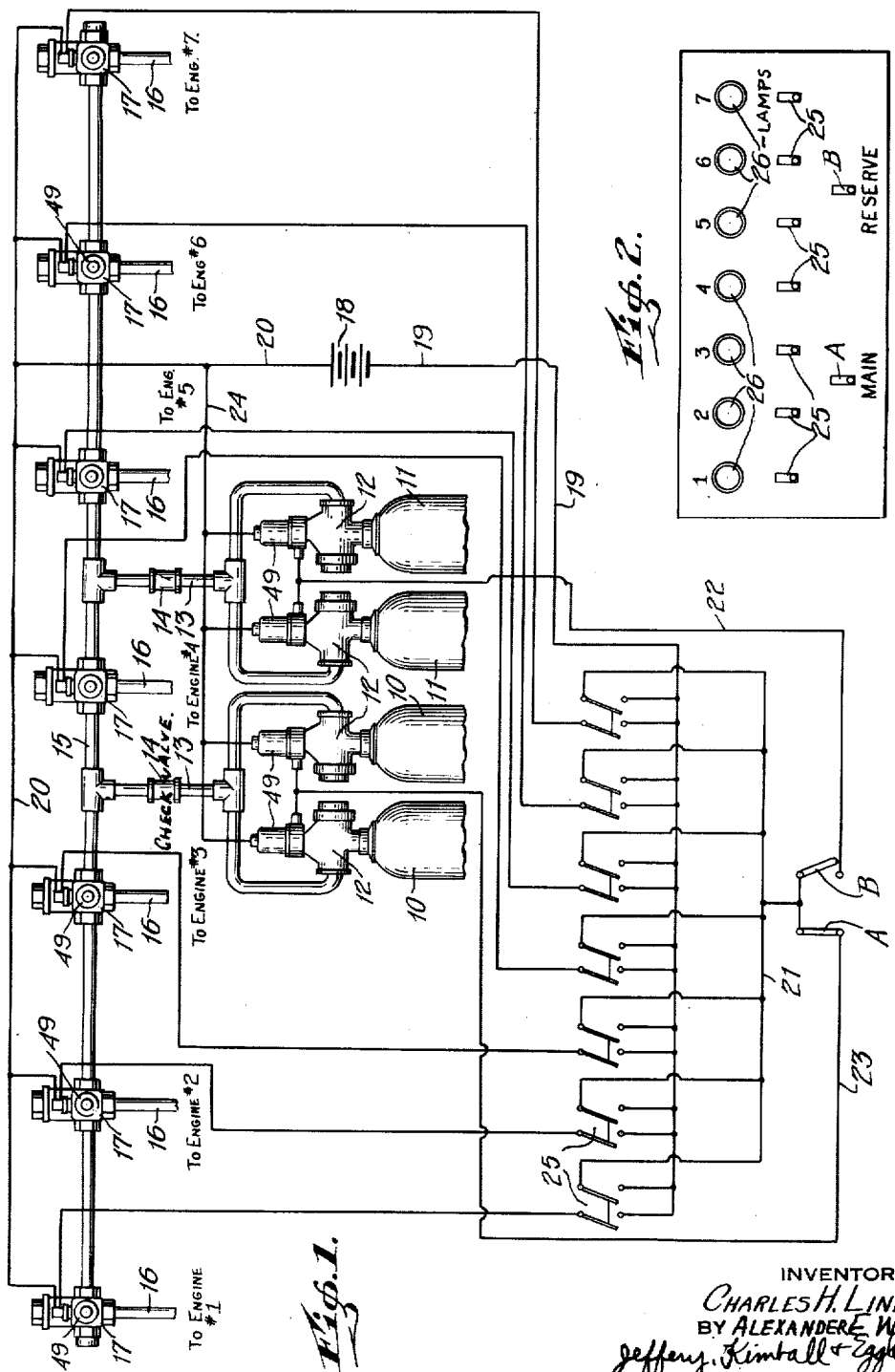
INVENTOR
CHARLES H. LINDSAY &
BY ALEXANDER E. WEAVER
Jeffery, Kimball & Eggleston
ATTORNEYS

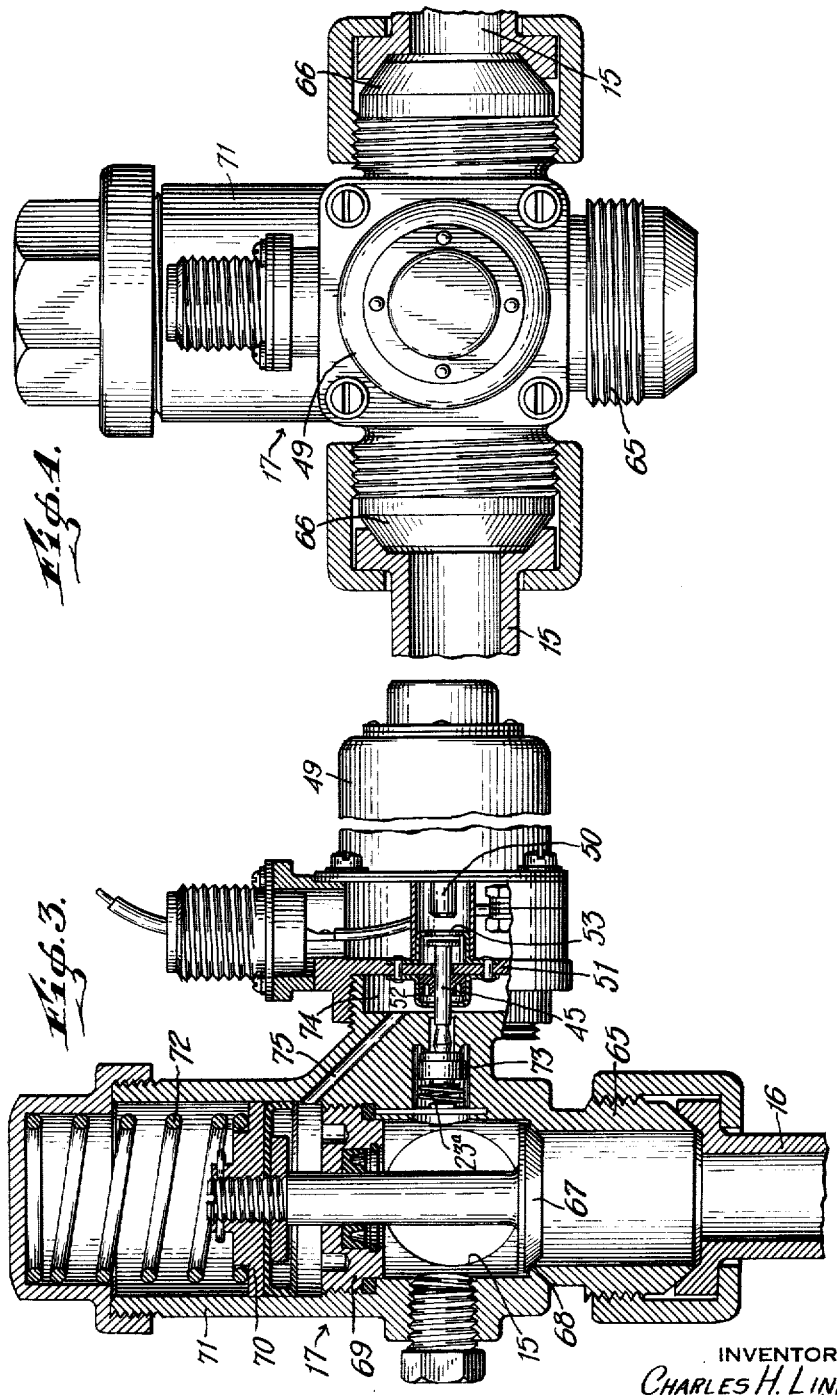

April 30, 1946.  C. H. LINDSAY ET AL  2,399,553
AIRCRAFT FIRE EXTINGUISHING SYSTEM
Filed Oct. 27, 1944
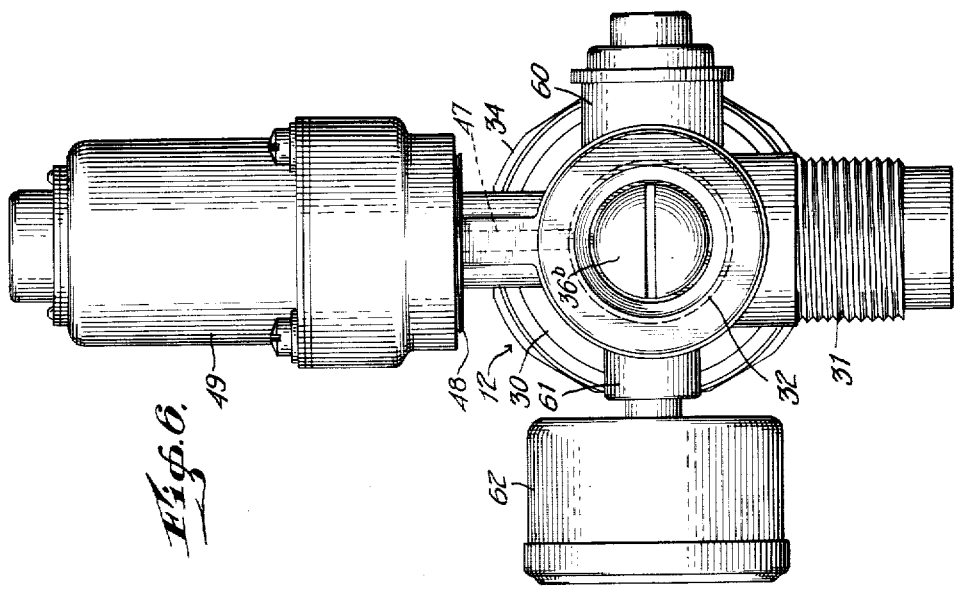
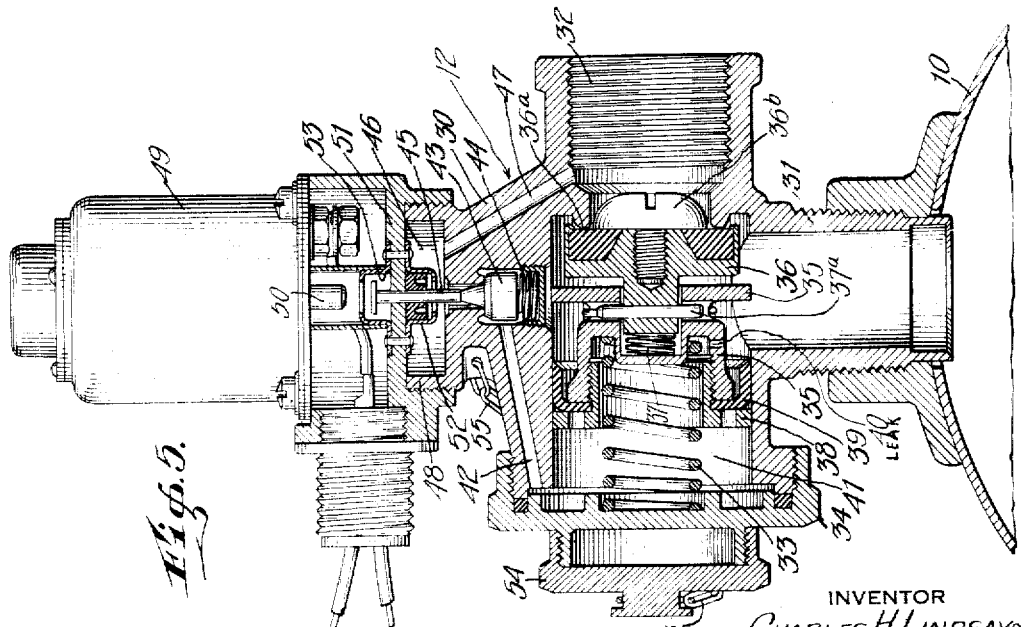
INVENTOR
CHARLES H LINDSAY
BY ALEXANDER E WEAVER
Jeffery, Kimball & Eggleston
ATTORNEYS Patented Apr. 30, 1946

2,399,553

UNITED STATES PATENT OFFICE 2,399,553

AIRCRAFT FIRE EXTINGUISHING SYSTEM

Charles H. Lindsay and Alexander E. Weaver, Elmira, N. Y., assignors to American-La France-Foamite Corporation, Elmira, N. Y., a corporation of New York Application October 27, 1944, Serial No. 560,569

14 Claims. (Cl. 169—2)

This invention is a distribution system for discharging a fire extinguishing medium from a source of pressure supply, such as a battery of flasks of liquefied gas, to any selected one of a number of spaces or fire hazards, and includes the organization of the controlling valves for such system, being especially adapted for use on aircraft where considerations of light weight and prompt and reliable operation are of first importance. Such systems are known in this art but are costly to manufacture and install and are unduly heavy. The object of this invention is to improve such systems and their speed of action and to simplify the valve structure thereof so as to provide an instantaneous full open discharge path from the source to the fire, accomplished with minimum weight of apparatus.

In the accompanying drawings,

Fig. 1 is a diagram of the new system in a simple form.

Fig. 2 is a plan of the selective control switchboard.

Fig. 3 is an axial section of one of the electrically controlled stop valves.

Fig. 4 is a side elevation thereof.

Fig. 5 is an axial section through one of the release valves which open the flask, and Fig. 6 a side elevation of Fig. 5.

Referring first to the system diagram, the gas source is represented as a battery of four flasks divided into two sections, those marked 10 being one section, regarded as the main section, and those marked 11 being the other, and regarded as a reserve section. Each flask of each section, in the present case, is normally closed by a release or flask valve 12 which connects it by piping 13, and check valves 14, to the main distribution line or header 15. The check valves prevent flow from the header toward the flasks. Where the flasks in one section include more than two, the pressure released from one of them may be utilized to release the gas from the others in the customary manner.

The main line 15 is connected to a plurality of branch pipes 16, leading to the various points of fire hazard, seven being shown, in present case identified as the engine compartments of a 7-engined airplane, but the number is of no consequence. Each junction between the main pipeline 15 and each of its branch pipes 16, is constituted by a stop valve 17, which valves are normally closed and arranged to be opened selectively and by electric action, when circumstances require. That is to say, in the event of fire in a certain compartment, for instance the compartment of engine No. 1, the pilot or operator closes one of the selector switches which is assigned to and marked "Engine No. 1." Thereby he completes a circuit from the current source 18, through wire 19, the particular electric stop valve 17 of engine No. 1 back via wire 20 to the current source. This opens the stop valve to engine No. 1.

The selector switch of engine No. 1, like all the others, is a double-contact switch and its closure simultaneously closes another circuit from the source via wire 19, wire 21, switch A and wire 23 to the electric release valves 12 of the flasks of the section marked 10, and thence by wire 24 back to the current source.

Thus the stop valve for engine No. 1 and the release valve or valves of such section 10 of the gas battery are opened simultaneously so that the gas or other extinguishing medium released from the flasks 10 flows at once to the compartment of engine No. 1, all the other stop valves being closed.

In the event that the gas thus admitted to the compartment of engine No. 1 is insufficient to extinguish the fire, or in the event of a reflash, the operator then closes the reserve switch B (opening A), but leaving selector switch of engine No. 1 closed, and thereby establishes a current path via wire 22 which will be seen to energize and open the flask valves 12 of the reserve group of flasks 11, thereby releasing a second discharge (from the reserve section) to engine No. 1. If there is no reflash, or no need for such second discharge, the selector switch of engine No. 1 is reopened and the switch B is closed, thereby setting the system in readiness for a second fire in any compartment, in which case the gas from the reserve flasks 11 will be used for extinguishing it. Either switch A or switch B is always kept closed so that in time of fire only a single switch-closing operation is required for extinguishing a fire.

The switchboard for the system is indicated in Fig. 2 wherein the parts marked 25 are the buttons or handles for the selector switches assigned to the respective engine compartments as marked thereon. Main and reserve switches A and B are located directly below them, appropriately marked. There may be one switch, if desired, with double contacts so arranged as to keep either wire 23 or wire 22 always connected to wire 21. The circles 26 represent indicator lamp windows connected to heat detectors in the respective compartments and thermally organized to flash a light in the appropriate window in the event of fire therein, thus informing the operator of the location of the fire. As before stated, one of the switches A or B is always closed so that the operation of but one switch is all that is required, which can be done instantaneously.

Referring now to the structure of the release valves, shown in Figs. 5 and 6, each of these valves is comprised of a valve body 30, having a tubular externally threaded boss 31 in line with its axis, for attachment to the flask, and another internally threaded boss 32, arranged at right angles to the first for connection to the discharge piping 13.

The valve chamber occurs at the junction of the axes of these two tubular bosses and is completed by a chamber cover 34, by which access to the interior of the valve can be had, this being the only valve cover for this purpose. The chamber contains a laterally reciprocable piston-type valve member which closes outwardly and is normally urged to its seat by the joint effects of the gas pressure and the presence of a spring 33 interposed between it and the cover.

This valve member is composed of three parts as follows: a main thimble-form part 35 and a valve-disc proper 36 which is connected thereto by a loose type of joint to make the disc self-accommodating to the plane of its valve seat, as customary in valves. This joint is made by telescoping the stem part of the disc into a socket in the thimble against a small spring 37 and pinning it there by a cotter marked 37a, or the like. The packing washer 36a is held in place by a large round-headed screw 36b approximating the diameter of the valve outlet so as to aid in centering the valve disc as it closes.

The other or third part of the valve member is a flanged ring 38, screwed into the thimble part 35, as a means of clamping the packing leather 39 in place. The flange of this ring rides in the cylindrical bore of the valve chamber and with the thimble part constitutes the piston. Inasmuch as both valve parts (35 and 38) are tubular, the valve-seating spring 33 can be partly housed within them as indicated, thus economizing space and weight.

Fluid pressure from the flask is admitted to the cylindrical space 41 on the outer side of the piston by way of a small leak-hole 40 drilled in the side wall of the thimble part, thus substantially balancing the fluid pressures on both sides of the piston. If the pressure gas in the space 41 is withdrawn therefrom at a greater rate than it can be replenished by leakage through the fine hole 40, the pressure difference thereby brought about on the piston forces the valve member to the left in Fig. 5, thus opening the valve against the pressure of the spring 33. This is because the effective area of the piston's inner face exceeds that of the valve disc.

Means for thus withdrawing gas from space 41 are provided by a passageway or channel 42 of liberal cross area which is drilled in the body of the valve leading from the space 41 to the chamber of a by-pass valve 43 which closes outwardly and also, in the present case, upwardly, by the pressure of a small spring 44; normally it is also held closed by the gas pressure.

This by-pass valve is arranged to be opened by a striker pin 45 carried in and forming part of the electric actuating unit presently referred to, and when open, allows the pressure fluid of the space 41 to escape into the chamber 46, and thence by channel 47, of equally liberal dimension, to the interior of the outlet boss 32, i. e., to the discharge pipe 13 connected to such boss, and from thence into the header 15. The capacity of the pipe and header is so large compared to that of the space 41 that the entry of more pressure fluid into the latter, by way of the restricted leak-hole 40, is quite incapable of restoring the piston balance. The release valve is thus quickly opened letting the full flow of gas into the header. This entry of gas into the header, however, does not restore the piston balance because of the practically simultaneous opening of the selected stop valve which keeps the header pressure always lower than the flask pressure. The release valve member thus flies to its full open position instantly on the impact of the striker with the by-pass valve, and is held in its open position by the flask gas pressure so long as the by-pass valve 43 is held open.

The actuating means for the by-pass valve 43 is a removable unit screwed onto another boss 48 formed for the purpose on the valve body, therewith to form the chamber 46 which is part of the pressure escape passage just described. It may be mechanical but is preferably electromagnetic, in which case it comprises a solenoid not shown but contained in the casing 49 and having its armature 50 appropriately arranged to strike the striker pin 45 and drive it against the by-pass valve, unseating it. This pin is carried in the wall 51 of the unit which wall covers or completes the chamber 46, and is provided with a packing 52 to prevent gas leakage; it is also provided with a retainer or guard 53 to limit its upward movement.

When the electromagnetic unit has been removed from the valve, as by unscrewing it from the boss 48, and which is done when the flask is to be refilled, the chamber 46 is intended to be then covered or closed by the use of an auxiliary or substitute screw cover 54, which, for convenience, is normally stored on the cover 34 by being screwed to a small flange thereon as indicated. It is made captive to the valve by means of a chain 55 so as to be always available. When the substitute cap is screwed in place on the boss 48, it not only prevents escape of gas when the flask is being recharged (through boss 32), but also protects the pilot valve and guards against its operation while the flask is in shipment.

As shown in Fig. 6, the release valve body 30 is also cast with two other radial tubular bosses, one of which, marked 60, accommodates the usual safety blow-off disc, not shown but customary in high pressure flasks, and the other, marked 61, accommodates a pressure gauge 62, when that is desired. The main valve body or case thus has six tubular bosses radiating from its central valve chamber. In the present case the boss 48 for the electromagnetic unit is located at the top end of the valve body in line with the flask axis but it could be otherwise if desired, for example, so as to be in a horizontal position when in use, in which case either the pressure gauge or the safety blow-off could be on top. The organization is particularly compact and therefore light in weight.

Referring to the stop-valves 17, they are all of identical structure, piston-operated, and as will be observed from Figs. 3 and 4, each of them has one tubular threaded boss 65 coupled to a branch pipe 16. This boss is in line with the operating piston. Each has also two other tubular threaded bosses 66 at right angles to the piston by means of which the valve is connected into the main line or header 15. The valve chamber of the valve occurs at the junction of the axes of these three bosses and this chamber forms part of the header passage. The valve thus serves as a valve and also as a T connection to the branch pipe avoiding the need of a separate pipe T for that purpose.

The valve element proper, or disc 67, closes outwardly toward the branch boss 65 against a valve seat 68 at the inner end of the latter. Its stem extends across the valve chamber and through a screwed-in gland 69 for connection to its operating piston 70 contained within the cylindrical part 71 of the valve body. The spring 72 in the end of this cylinder acts on the piston to close the valve, its normal condition.

Opening of the branch pipe valve 67 is accomplished by pressure fluid admitted to the inner end of the cylinder by way of a by-pass controlled by a by-pass valve 73, said by-pass opening directly out of the valve chamber into a by-pass chamber 74 connected to the cylinder by a duct 75. The by-pass valve closes outwardly under the pressure of a small spring 23a, as indicated, as well as by the fluid pressure when that is present. It is opened by a striker pin 45 under the impact of the armature 50 of the electromagnetic unit 49 which is identical with the unit already described. Opening of the by-pass valve 73 causes the piston to throw the valve member 67 to its full open position in which it remains so long as the by-pass valve is held open and pressure is present.

It will be noted that the release valves and the stop-valves have a common characteristic in that each has a boss to receive and support its electromagnetic unit or operating mechanism, all the bosses being of the same dimensions so that the units can be interchangeable therewith. This is an important item of economy in respect to cost and time of installation. The structure of the unit is such as to form part of either valve structure when applied to it. That is to say, its end wall 51 completes the chamber 46 when applied to the release-valve and completes the by-pass chamber 74 when applied to the stop-valve. Since it carries the striker pin 45, removal of the unit renders the important by-pass valve quickly accessible for inspection and testing.

We claim:

1. In a fire extinguishing distribution system, the combination with a source of compressed gas, a delivery pipe system therefor having a header with branches extending to different points of use, a normally-closed piston-operated stop-valve for each branch, each including a by-pass valve to admit header pressure to the piston thereof for opening the stop-valve by the effect of said pressure admission, a normally closed release valve to control the admission of gas from said source into said pipe system and a by-pass duct and valve for said release valve, of electric control means including a plurality of electromagnetic valve-operating units, one of said units being applied to each of said by-pass valves, a plurality of selector switches located at an operator's station respectively connected to the electromagnetic units of said stop valves, each switch controlling a circuit through one of said stop valve units and another circuit through the electromagnetic unit of said release valve, for energizing said two units and thereby discharging gas through a selected branch of the system.

2. In a fire extinguishing distribution system, the combination with a source of compressed gas, of a delivery pipe system therefor having branch pipes extending to different points of use, a normally-closed piston-operated stop-valve for each branch pipe, a by-pass duct and valve for each stop-valve and a normally closed piston-operated release valve to admit gas from the source into said pipe system, said release valve including means for admitting pressure gas to a face of the piston thereof to act thereon in the direction to close the valve said means including a by-pass duct for such pressure gas leading from such piston face into the pipe system and a by-pass valve controlling said duct, control means including a plurality of units, one of said units being applied to each by-pass valve of said stop-valves and to the by-pass valve of said release valve, and a plurality of selector members respectively connected to said units, each controlling the unit of one of said stop-valves and the unit which operates said release valve.

3. In a fire extinguishing distribution system, the combination with a source of compressed gas, of a delivery pipe system therefor having branch pipes extending to different points of use, a normally-closed piston-operated stop-valve for each branch pipe, a by-pass duct and valve for each stop-valve, and a normally-closed piston-operated release valve to admit gas from the source into said pipe system, said release valve including means for admitting pressure gas to a face of the piston thereof to act thereon in the direction to close the valve said means including a by-pass duct for such pressure gas leading from such piston face into the delivery pipe system and a by-pass valve controlling said by-pass duct, electric control means including a plurality of electromagnetic units, one of said units being applied to the by-pass valve of each of said stop-valves and to the by-pass valve of said release valve for opening said by-pass valves, a plurality of selector switches respectively connected to said units, each controlling a circuit through the unit of one of said stop valves and another circuit through the unit which operates said release valve, said selector switches being located in a panel at the operator's station whereby the operator may release and selectively discharge gas through any one of said branch pipes by the use of one only of said switches.

4. In a fire extinguishing distribution system comprising a source of compressed gas, a normally closed valve to release the gas into a branched delivery pipe system and stop-valves normally closing the respective branches, each of said valves having a by-pass duct and valve to cause its operation by the effect of gas pressure and all of them having identical bosses on their valve bodies for interchangeable attachment to actuating means for said by-pass valves, said means comprising a plurality of electromagnetic units, one of said units being attached to each of the said valves by means of the bosses thereon, a switch-panel containing an equal number of selector switches respectively corresponding to the electromagnetic units of said stop-valves and each controlling a circuit through its respective unit and another circuit through the electromagnetic unit attached to said releasing valve.

5. A fire extinguishing distribution system comprising a source of compressed gas divided in two sections, a separate and normally closed release valve for each section of said gas source, a delivery pipe system common to both sections and including a header with branch pipes extending to different points of use, a normally closed stop-valve for each branch pipe, a by-pass duct and valve for each stop and release valve, electric means for opening said release and stop valves and comprising an electromagnetic unit applied to each by-pass valve of said stop-valves and to each by-pass valve of said release valves for opening them, a control switchboard containing selector switches corresponding respectively to all said stop-valves, each adapted for simultaneously closing a circuit including one of said stop-valve units and another circuit including the unit of the release valve of one of said sections of said gas source, and a reserve switch adapted for operation to introduce the electromagnetic unit of the other section of the gas source into the control of said selector switches, whereby a single selector switch may discharge the gas from either section of the gas sources to any branch pipe.

6. In a fire extinguishing distribution system, the combination of a source of compressed gas divided into two sections, a separate and normally closed release valve for each section of said gas source, a delivery pipe system common to both sections and including branch pipes extending to different points of use, a normally closed stop-valve for each branch pipe, a by-pass duct and valve for each stop and release valve, electric means for opening said release valves and stop-valves, including an electromagnetic unit applied to each of said valves, a control switchboard containing selector switches corresponding respectively to said stop-valves, circuits respectively including one of said selector switches and one of said stop-valve units, each of the electromagnetic units of said release valves having a circuit and switch means therefor adapted to connect either of them into the control of the selector switches, whereby a single selector switch may cause discharge of gas from either section of the gas source to any branch pipe independently of the other section.

7. In a fire extinguishing distribution system, the combination of a source of compressed gas divided in two sections, a separate and normally closed release valve for each section of said gas source, a delivery pipe system common to both sections and including branch pipes extending to different points of use, a normally-closed stop-valve for each branch pipe, a by-pass duct and valve for each stop and release valve, electric means for opening said release valves and stop-valves including an electromagnetic unit applied to each of said valves, a control switchboard containing a series of double-contact switches corresponding respectively to the units of said stop-valves, each, adapted by one of its contacts to close a circuit including the stop-valve unit assigned to it and, by the other contact, to close a circuit including one of said release valve units, and reserve switch connected for putting the other release valve unit into circuit with the last mentioned contact.

8. In a fire extinguishing distributing system, the combination of a source of compressed gas provided with normally closed release valve, a header to receive the released gas having branch pipes leading to different points of use, stop-valves having their valve chambers constituting the junctions between two sections of said header and the branch pipe, a valve in each chamber normally closing a branch pipe, a by-pass duct and valve in each stop and release valve, electric means for opening said release valve and stop-valves including an electric unit applied to each stop-valve and release valve, a plurality of selector switches corresponding to said stop-valves, each adapted to close a circuit through the electric unit of one of said stop valves and another circuit through the electric unit of said release valve for simultaneously energizing them.

9. In a fire extinguishing distribution system, the combination of a source of compressed gas provided with a normally closed release valve, a by-pass duct provided with a by-pass valve to cause said release valve to open and discharge its gas into a distribution system comprising a header, branch pipes and stop-valves, the casings of said stop-valves forming connecting parts between the pipe sections constituting such header, as well as the means of connection of the header to the branch pipes, and each containing a piston-operated valve member closing against the outlet into its branch pipe and each having its operating piston opposite to said outlet, a by-pass duct having a by-pass valve for admitting header gas from within the stop-valve casing to act on said operating piston, and an electromagnetic unit applied to each of said by-pass valves, a plurality of selector switches, one switch being connected to the unit of each stop valve, each switch being adapted to close a circuit simultaneously through the electric unit of one of said stop-valves and another circuit through the electric unit of said release valve for simultaneously energizing said units and opening said release valve and one of said stop-valves.

10. In a fire extinguishing distribution system, the combination with a source of compressed gas, of a delivery pipe system therefor having a header with branches extending to different points of use, a normally-closed piston-operated stop-valve for each branch, each including a by-pass valve to admit header pressure to the piston thereof for opening the stop-valve by the effect of said pressure admission, a normally closed release valve to control the admission of gas from said source into said pipe system, electrically actuated control means applied to each of said stop valves and to said release valve, each of said control means including an electromagnetic unit, a plurality of selector switches located at an operator's station respectively connected to the electromagnetic units of said valves, each controlling a circuit through one of said stop valve units and another circuit through the electromagnetic unit of said release valve, for energizing said two units and thereby discharging gas through a selected branch of the system.

11. A fire extinguishing distribution system comprising a source of compressed gas divided in two sections, a separate and normally closed release valve for each section of said gas source, a delivery pipe system common to both sections and including a header with branch pipes extending to different points of use, a normally closed stop-valve for each branch pipe, electrically actuated means for opening said release and stop valves comprising an electromagnetic unit applied to each by-pass valve of said stop-valves and to both of said release valves for opening them, a control switchboard containing selector switches corresponding respectively to all said stop-valves, each adapted for simultaneously closing a circuit including one of said stop-valve units and another circuit including the unit of the release valve of one of said sections of said gas source, and a reserve switch adapted for operation to introduce the electromagnetic unit of the other section of the gas source into the control of said selector switches, whereby a single selector switch may discharge the gas from one or both sections of the gas source to any branch pipe.

12. In a fire extinguishing distribution system, the combination of a source of compressed gas divided in two sections, with a separate and normally closed release valve for each section of said gas source, a delivery pipe system common to both sections and including branch pipes extending to different points of use, a normally closed stop-valve for each branch pipe, electrically actuated means for opening said release valves and stop-valves, including an electromagnetic unit applied to each of said valves, a control switchboard containing selector switches corresponding respectively to said stop-valves, circuits respectively including one of said selector switches and one of said stop-valve units, each of the electromagnetic units of said release valves having a circuit and switch means therefor adapted to connect either of said circuits into the control of the selector switches, whereby a single selector switch may cause discharge of gas from either section of the gas sources to any branch pipe independently of the other section.

13. In a fire extinguishing distribution system, the combination of a source of compressed gas divided in two sections, with a separate and normally closed release valve for each section of said gas source, a delivery pipe system common to both sections and including branch pipes extending to different points of use, a normally-closed stop-valve for each branch pipe, electrically actuated means for opening said release valves and stop-valves including an electromagnetic unit applied to each of said valves, a control switchboard containing a series of double-contact switches corresponding respectively to the units of said stop-valves, each adapted, by one pair of its contacts, to close a circuit including the stop-valve unit assigned to it and, by the other contact, to close a circuit including one of said release valve units, and a reserve switch connected for putting the other release valve unit into circuit with the last mentioned contact.

14. In a fire extinguishing distributing system, the combination of a source of compressed gas provided with normally closed release valve, with a header to receive the released gas having branch pipes leading to different points of use, stop-valves having their valve chambers constituting the junctions between two sections of said header and the branch pipe, a valve in each chamber normally closing a branch pipe, electrically actuated means for opening said release valve and stop-valves including an electric actuating unit applied to each stop-valve and release valve, a plurality of selector switches corresponding to said stop-valves, each adapted to close a circuit through the electric actuating unit of one of said stop-valves and another circuit through the electric actuating unit of said release valve for simultaneously energizing them.

CHARLES H. LINDSAY.
ALEXANDER E. WEAVER.

DISCLAIMER 2,399,553.—*Charles H. Lindsay* and *Alexander E. Weaver*, Elmira, N. Y. AIRCRAFT FIRE EXTINGUISHING SYSTEM. Patent dated Apr. 30, 1946. Disclaimer filed Feb. 18, 1947, by the assignee, *American-La France-Foamite Corporation*.

Hereby enters this disclaimer to claims 1, 4, and 10 of said patent.

[*Official Gazette March 18, 1947.*]

discharge the gas from one or both sections of the gas source to any branch pipe.

12. In a fire extinguishing distribution system, the combination of a source of compressed gas divided in two sections, with a separate and normally closed release valve for each section of said gas source, a delivery pipe system common to both sections and including branch pipes extending to different points of use, a normally closed stop-valve for each branch pipe, electrically actuated means for opening said release valves and stop-valves, including an electromagnetic unit applied to each of said valves, a control switchboard containing selector switches corresponding respectively to said stop-valves, circuits respectively including one of said selector switches and one of said stop-valve units, each of the electromagnetic units of said release valves having a circuit and switch means therefor adapted to connect either of said circuits into the control of the selector switches, whereby a single selector switch may cause discharge of gas from either section of the gas sources to any branch pipe independently of the other section.

13. In a fire extinguishing distribution system, the combination of a source of compressed gas divided in two sections, with a separate and normally closed release valve for each section of said gas source, a delivery pipe system common to both sections and including branch pipes extending to different points of use, a normally-closed stop-valve for each branch pipe, electrically actuated means for opening said release valves and stop-valves including an electromagnetic unit applied to each of said valves, a control switchboard containing a series of double-contact switches corresponding respectively to the units of said stop-valves, each adapted, by one pair of its contacts, to close a circuit including the stop-valve unit assigned to it and, by the other contact, to close a circuit including one of said release valve units, and a reserve switch connected for putting the other release valve unit into circuit with the last mentioned contact.

14. In a fire extinguishing distributing system, the combination of a source of compressed gas provided with normally closed release valve, with a header to receive the released gas having branch pipes leading to different points of use, stop-valves having their valve chambers constituting the junctions between two sections of said header and the branch pipe, a valve in each chamber normally closing a branch pipe, electrically actuated means for opening said release valve and stop-valves including an electric actuating unit applied to each stop-valve and release valve, a plurality of selector switches corresponding to said stop-valves, each adapted to close a circuit through the electric actuating unit of one of said stop-valves and another circuit through the electric actuating unit of said release valve for simultaneously energizing them.

CHARLES H. LINDSAY.
ALEXANDER E. WEAVER.

DISCLAIMER 2,399,553.—*Charles H. Lindsay* and *Alexander E. Weaver*, Elmira, N. Y. AIRCRAFT FIRE EXTINGUISHING SYSTEM. Patent dated Apr. 30, 1946. Disclaimer filed Feb. 18, 1947, by the assignee, *American-La France-Foamite Corporation.*
Hereby enters this disclaimer to claims 1, 4, and 10 of said patent.
[*Official Gazette March 18, 1947.*]